(12) United States Patent
Gotou et al.

(10) Patent No.: US 9,077,456 B2
(45) Date of Patent: Jul. 7, 2015

(54) VISIBLE LIGHT RECEIVING DEVICE AND VISIBLE LIGHT RECEIVING METHOD

(71) Applicant: Panasonic Intellectual Property Management Co., Ltd., Osaka (JP)

(72) Inventors: Makoto Gotou, Hyogo (JP); Masaaki Ikehara, Osaka (JP); Yoshihiko Matsukawa, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 63 days.

(21) Appl. No.: 14/118,930

(22) PCT Filed: Mar. 6, 2013

(86) PCT No.: PCT/JP2013/001397
§ 371 (c)(1),
(2) Date: Nov. 20, 2013

(87) PCT Pub. No.: WO2013/150716
PCT Pub. Date: Oct. 10, 2013

(65) Prior Publication Data
US 2014/0093254 A1  Apr. 3, 2014

(30) Foreign Application Priority Data
Apr. 3, 2012  (JP) .................................. 2012-084552

(51) Int. Cl.
*H04B 10/69* (2013.01)
*H04B 10/04* (2006.01)
(Continued)

(52) U.S. Cl.
CPC .............. *H04B 10/63* (2013.01); *H04B 10/116* (2013.01)

(58) Field of Classification Search
CPC . H04B 10/693; H04B 10/116; H04B 10/1141
USPC .................................. 398/202, 203, 118, 119
See application file for complete search history.

(56) References Cited

U.S. PATENT DOCUMENTS

| 5,617,235 A | 4/1997 | Abrahamson |
| 5,926,301 A | 7/1999 | Hirt |

(Continued)

FOREIGN PATENT DOCUMENTS

| EP | 1 447 951 | 8/2004 |
| EP | 1 956 734 | 8/2008 |

(Continued)

OTHER PUBLICATIONS

International Search Report issued May 21, 2013 in International (PCT) Application No. PCT/JP2013/001397.

(Continued)

*Primary Examiner* — Oommen Jacob
(74) *Attorney, Agent, or Firm* — Wenderoth, Lind & Ponack, L.L.P.

(57) ABSTRACT

A receiving device includes a first conversion unit, an amplification unit, and a microcomputer. The microcomputer includes: a second conversion unit that performs, for each sampling time duration, AD conversion on a voltage signal into an AD-converted value; a first calculation unit that calculates a difference digital value by difference calculation; a second calculation unit that calculates a positive reference value and a negative reference value; a detection unit that detects a rising point starting difference digital values greater than the positive reference value, and a falling point starting difference digital values smaller than the negative reference value; a third calculation unit that calculates a first sample period and a second sample period; and a fourth calculation unit that calculates a modulated signal for each symbol time period based on the first sample period and the second sample period.

12 Claims, 10 Drawing Sheets

(51) Int. Cl.
*H03M 1/12* (2006.01)
*H03M 1/50* (2006.01)
*H04B 10/63* (2013.01)
*H04B 10/116* (2013.01)

(56) References Cited

U.S. PATENT DOCUMENTS

| | | | |
|---|---|---|---|
| 5,986,987 A * | 11/1999 | Taguchi et al. | 369/47.35 |
| 6,002,215 A * | 12/1999 | Yamashita et al. | 315/308 |
| 6,038,021 A * | 3/2000 | Piso et al. | 356/238.2 |
| 6,043,920 A | 3/2000 | Leopold et al. | |
| 7,289,560 B2 | 10/2007 | Huat | |
| 7,742,704 B2 | 6/2010 | Suzuki et al. | |
| 8,045,864 B2 | 10/2011 | Ann et al. | |
| 8,050,572 B2 | 11/2011 | Kawabe et al. | |
| 8,081,882 B2 | 12/2011 | Tuchler | |
| 2004/0141568 A1 | 7/2004 | Huat | |
| 2007/0092264 A1* | 4/2007 | Suzuki et al. | 398/189 |
| 2008/0187322 A1 | 8/2008 | Tuchler | |
| 2008/0273628 A1 | 11/2008 | Kurata | |
| 2008/0298816 A1 | 12/2008 | Kawabe et al. | |
| 2009/0091486 A1* | 4/2009 | Wiesbauer et al. | 341/143 |
| 2009/0157309 A1 | 6/2009 | Won et al. | |
| 2010/0103015 A1* | 4/2010 | Yoshida et al. | 341/143 |
| 2010/0209118 A1* | 8/2010 | Takene et al. | 398/182 |
| 2011/0063510 A1 | 3/2011 | Lee et al. | |
| 2011/0114842 A1* | 5/2011 | Ji et al. | 250/340 |
| 2012/0075128 A1* | 3/2012 | Aruga et al. | 341/110 |
| 2013/0242283 A1* | 9/2013 | Bailey et al. | 356/4.01 |
| 2014/0093254 A1* | 4/2014 | Gotou et al. | 398/203 |

FOREIGN PATENT DOCUMENTS

| | | |
|---|---|---|
| JP | 2001-512918 | 8/2001 |
| JP | 2004-072365 | 3/2004 |
| JP | 2007-97071 | 4/2007 |
| JP | 2008-104020 | 5/2008 |
| JP | 2008-154063 | 7/2008 |
| JP | 2008-167303 | 7/2008 |
| JP | 2008-193701 | 8/2008 |
| JP | 2009-118180 | 5/2009 |
| JP | 2009-135876 | 6/2009 |
| JP | 2009-219074 | 9/2009 |
| JP | 2009-290359 | 12/2009 |
| JP | 2010-239350 | 10/2010 |
| WO | 99/07086 | 2/1999 |

OTHER PUBLICATIONS

European Search Report issued Mar. 2, 2015 for the corresponding European Patent Application No. 13773145.1.

* cited by examiner

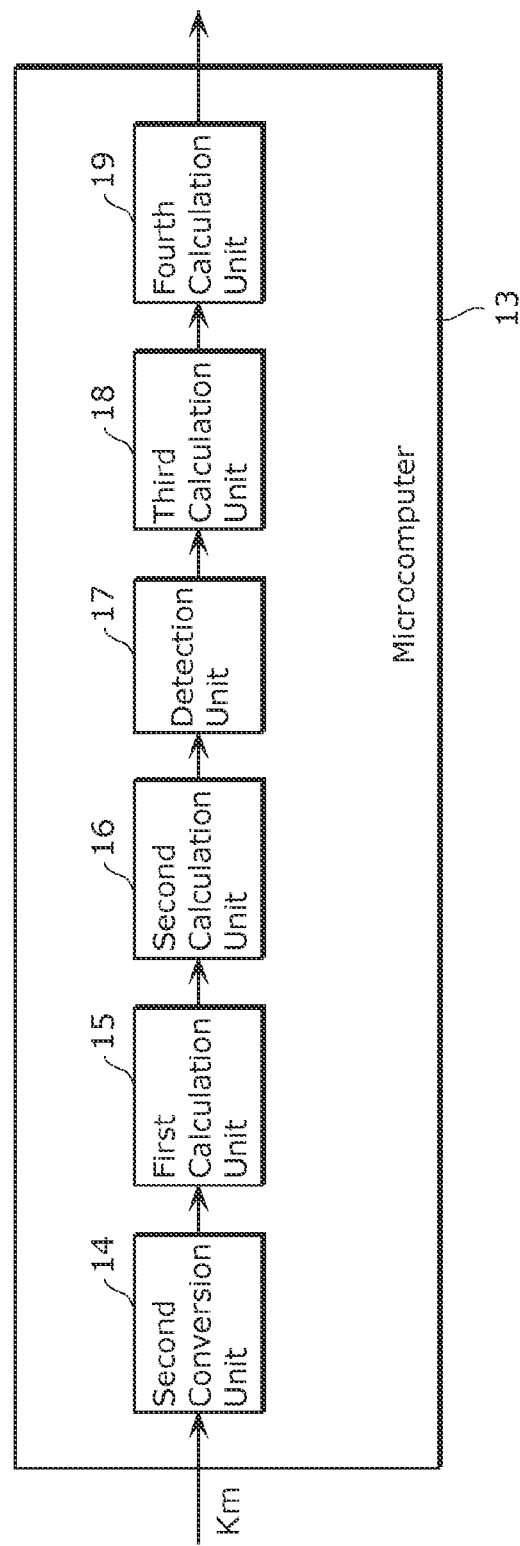

VISIBLE LIGHT RECEIVING DEVICE AND VISIBLE LIGHT RECEIVING METHOD

TECHNICAL FIELD

The present invention relates to visual light receiving devices and visual light receiving methods all of which detect identification (ID) information based on a change of visible light illumination.

BACKGROUND ART

The Global Positioning System (GPS) has been used to determine positions of mobile terminals. The GPS determines a position of a mobile terminal by receiving radio waves from a plurality of satellites. Therefore, it is difficult to receive the GPS service in underground malls and buildings where radio waves from the satellites are blocked.

In order to address the above difficulty, a visible light communication system including an illumination device has been conceived to detect positions of mobile terminals in underground malls and buildings (for example, Patent Literatures 1 and 2).

Patent Literature 1 discloses a visible light communication system applicable to an illumination device. FIG. 9 shows a configuration of the visible light communication system disclosed in Patent Literature 1.

The communication system 100 using visible light includes a transmitting device 110 and a receiving device 130. In the communication system 100, visible light is emitted from a light-emitting element 117 in the transmitting device 110, and then modulated according to a Quadrature Amplitude Modulation (QAM) signal generated from high-frequency carrier waves. After that, the resulting QAM-modulated signal is received by a light-receiving element 133 in the receiving device 130, and then demodulated. Here, the QAM-modulated signal is a signal of the visible light applied with the QAM modulation. The communication system 100 has a function of keeping a level of a received signal constant by using an Automatic Gain Control (AGC) 136. Furthermore, a communication system disclosed in Patent Literature 2 includes: a modulation unit that modulates sub-carrier waves; a light-blinking control unit that causes visible light to blink according to a modulated signal; and a ratio control unit that controls visible light to be emitted by changing a ratio of a light-emitting duration.

The visible light communication systems disclosed in Patent Literatures 1 and 2 can offer stable data communications using a modulated signal generated from high-frequency carrier waves. More specifically, in order to achieve stable data communications, Patent Literature 1 uses a QAM-modulated signal that is generated by multiplexing frequencies of carrier waves, and Patent Literature 2 controls visible light to blink according to a modulated signal using sub-carrier waves.

These communication systems can be used to determine a position of a mobile terminal (receiving device) even in an underground mall, if the mobile terminal receives visible light including ID information from an illumination device (transmitting device) provided in the underground mall.

Here, a communication distance between the illumination device and the mobile terminal changes according to a position of a user holding the mobile terminal. As the user walks, the communication distance changes with time. In the visible light communications, as a communication distance between a transmitting device and a receiving device is longer, a level of a received signal is drastically decreased. For example, a level of a received signal with a communication distance of 4 m is one sixty-fourth (1/64) of a level of a received signal with a communication distance of 0.5 m. In order to address such a significant change of a level of a received signal, Patent Literature 1 uses the AGC 136 to automatically adjust a level of an output signal to be constant, and then demodulates a visible light signal according to the output signal of the AGC circuit.

CITATION LIST

Patent Literature

[Patent Literature 1] Japanese Unexamined Patent Application Publication No. 2010-239350
[Patent Literature 2] Japanese Unexamined Patent Application Publication No. 2007-97071

SUMMARY OF INVENTION

Technical Problem

However, in the above-described conventional communication systems, the AGC has a complicated circuit structure. For example, it is very difficult to stably operate the AGC for received a signal having a level varying from 1 to 1/64. If high-frequency carrier waves are used, the structure of the AGC is simplified. However, in this case, circuit structures of a transmitter, a receiver, and the like become complicated.

Furthermore, if the AGC is used to automatically adjust a gain, a circuit response is sometimes delayed to cause distortion in an output signal of the AGC. For example, if a state of a communication path (visible light path) from the transmitting device to the receiving device is switched from a disconnected state to a connected state, there is a situation where a transient response delay of the AGC disables demodulation for several seconds to increase a waiting time until the operation start of the receiving device.

In short, the conventional visible light receiving devices have problems that a circuit structure is complicated and a response is slow.

In order to address the above-described conventional problems, an object of the present invention is to provide a visible light receiving device and a visible light receiving method which are capable of dealing with a significant change of a level of a signal of visible light without using an AGC and capable of receiving and demodulating the signal of the visible light in a short period without using the AGC.

Solution to Problem

In accordance with an aspect of the present invention for addressing the above-described conventional problems, there is provided a visible light receiving device including: a first conversion unit configured to receive visible light and generate a voltage signal corresponding to an amount of the visible light, the visible light having an intensity that varies depending on modulated signals which have a modulated part in each of symbol time periods; an amplification unit configured to cut a DC component in the voltage signal and amplify an AC component in the voltage signal, thereby generating an amplified voltage signal; and a processing unit configured to process the amplified voltage signal provided from the amplification unit to generate demodulated signals of the modulated signals, wherein the processing unit includes: a second conversion unit configured to perform, for each of sampling time durations, analog-to-digital (AD) conversion on the amplified voltage signal provided from the amplification unit into an AD-converted value, eventually generating a plurality of AD-converted values; a first calculation unit configured to calculate a difference between each pair among the AD-converted values to eventually generate a plurality of difference digital values; a second calculation unit configured to calculate a positive reference value and a negative reference value based on a peak value among the difference digital values; a detection unit configured to detect (a) at least one rising point from when successive difference digital values each greater than the positive reference value appear among the difference digital values, and (b) at least one falling point from when successive difference digital values each smaller than the negative reference value appear among the difference digital values; a third calculation unit configured to calculate a first sample period and a second sample period, the first sample period being a period from a target rising point to a falling point detected immediately subsequent to the target rising point, and the second sample period being a period from the falling point to another rising point detected immediately subsequent to the falling point; and a fourth calculation unit configured to calculate a corresponding one of the demodulated signals for each of the symbol time periods, based on the first sample period and the second sample period which appear alongside each other in a temporal sequence in the each of the symbol time periods.

In accordance with another aspect of the present invention for addressing the above-described conventional problems, there is provided a visible light receiving method of obtaining information from visible light, the visible light receiving method including: performing, by a first conversion unit, AD conversion on a voltage signal generated according to received visible light to generate an AD-converted value for each of sampling time durations, eventually generating a plurality of AD-converted values; calculating a difference between each pair among the AD-converted values to generate a plurality of difference digital values; calculating a positive reference value and a negative reference value based on a peak value among the difference digital values; detecting (a) at least one rising point from when successive difference digital values each greater than the positive reference value appear among the difference digital values, and (b) at least one falling point from when successive difference digital values each smaller than the negative reference value appear among the difference digital values; calculating a first sample period and a second sample period, the first sample period being a period from a target rising point to a falling point detected immediately subsequent to the target rising point, and the second sample period being a period from the falling point to another rising point detected immediately subsequent to the falling point; and calculating a demodulated signal corresponding to the voltage signal for each of symbol time periods, based on the first sample period and the second sample period which appear alongside each other in a temporal sequence in the each of the symbol time periods.

Advantageous Effects of Invention

The present invention can provide a visible light receiving device and a visible light receiving method which are capable of dealing with a significant change of a level of a signal of visible light without using an AGC and capable of receiving and demodulating the signal of the visible light in a short period without using the AGC.

BRIEF DESCRIPTION OF DRAWINGS

FIG. 2A is a block diagram of a microcomputer according to Embodiment 1.

In FIG. 3, (a) is a chart of illumination light Lm and disturbance light Dt, (b) is a chart of a voltage signal Jm, (c) is a chart of an amplified signal Km, and (d) is a chart of a rising point Rm and a falling point Fm.

In FIG. 4, (a) is a chart of illumination light Lm and disturbance light Dt, (b) is a chart of a voltage signal Jm, (c) is a chart of an amplified signal Km, and (d) is a chart of a rising point Rm and a falling point Fm.

In FIG. 7, (a) is a chart of illumination light Lm and disturbance light Dt, (b) is a chart of a voltage signal Jm, (c) is a chart of an amplified signal Km, and (d) is a chart of a rising point Rm and a falling point Fm.

DESCRIPTION OF EMBODIMENTS

Figure 1:
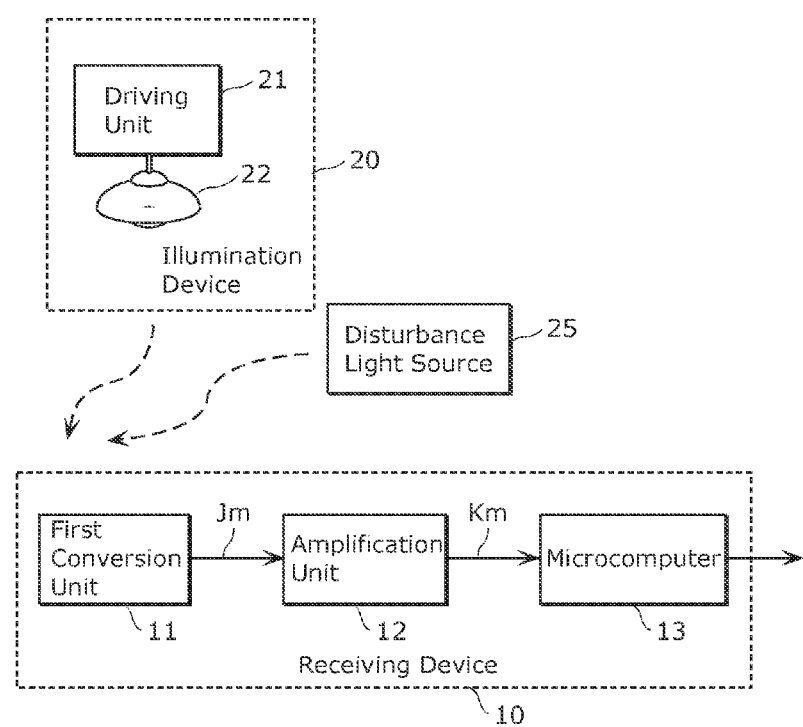
FIG. 1 is a configuration diagram of a visible light communication system including a receiving device according to Embodiment 1.

Hereinafter, certain exemplary embodiments are described with reference to the accompanying Drawings. It should be noted that the same reference numerals are assigned to identical structural elements, so that the identical structural elements are sometimes not explained repeatedly. For the sake of the convenience in understanding the Drawings, the figures mainly and schematically show the respective structural elements.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

Figure 2B:
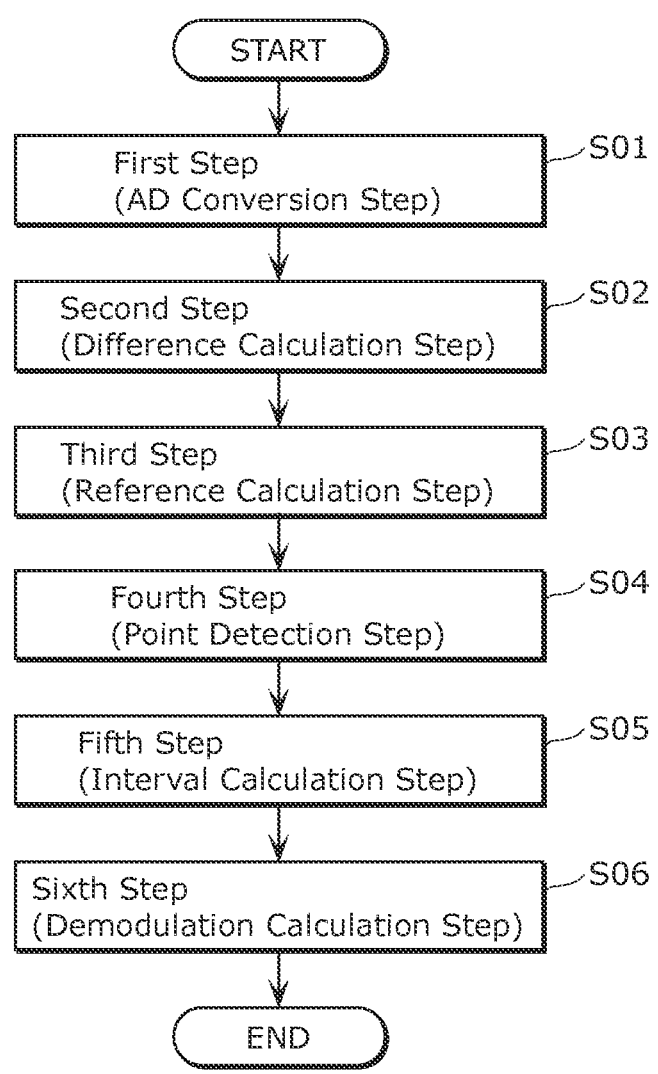
FIG. 2B is a flowchart of steps in processing performed by the microcomputer according to Embodiment 1.
Figure 3:
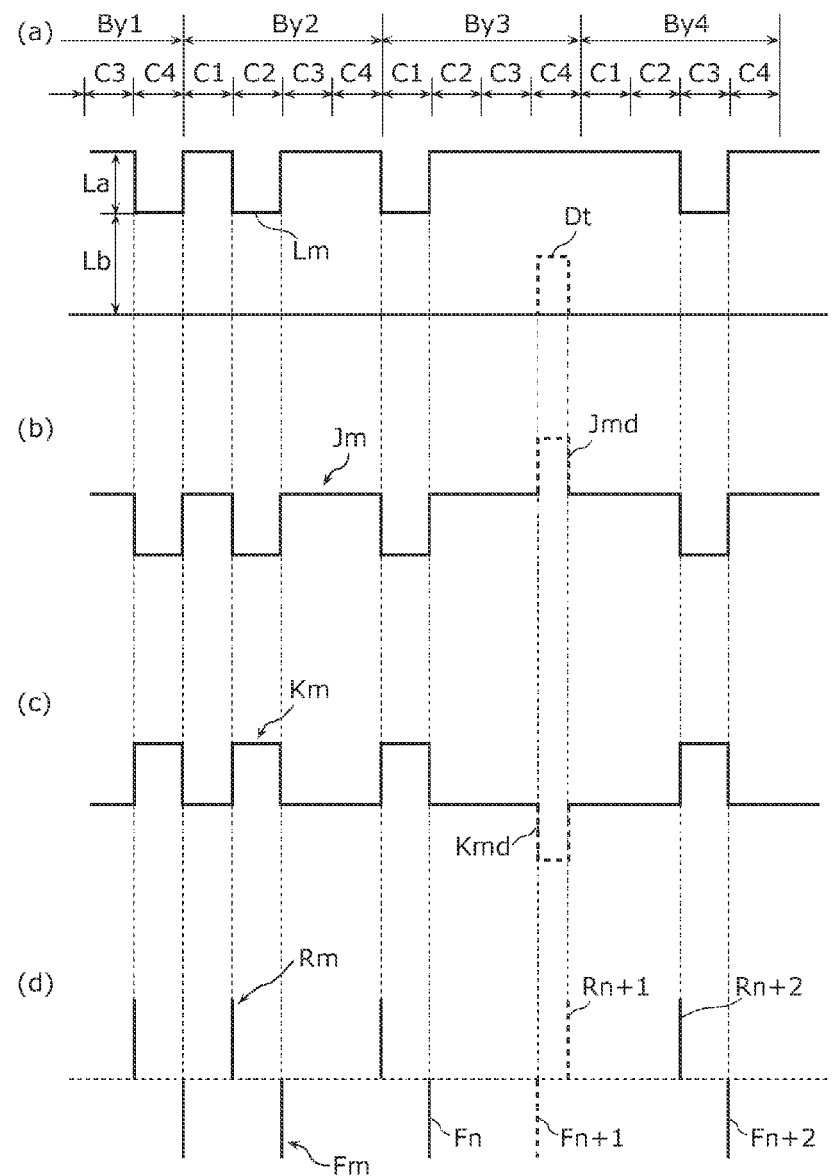
FIG. 3 is a waveform chart for explaining operations of a receiving device according to Embodiment 1.

FIG. 1 is a configuration diagram of a visible light communication system including a receiving device 10 according to Embodiment 1. The receiving device 10 is an example of a visible light receiving device. FIG. 2A is a block diagram of a microcomputer 13 according to Embodiment 1. The microcomputer 13 is an example of a processing unit. FIG. 2B is a flowchart of steps in processing performed by the microcomputer 13. (a) to (d) in FIG. 3 are waveform charts for explaining operations of the receiving device 10.

As shown in FIG. 1, the visible light communication system according to the present embodiment includes a receiving device 10 and an illumination device 20. The illumination device 20 is an example of a visible light illumination device (visible light transmitting device).

The receiving device 10 includes a first conversion unit 11, an amplification unit 12, and a microcomputer 13. The first conversion unit 11 is an example of a light-voltage conversion unit that converts light into a voltage (electric signal). The amplification unit 12 is an example of a DC-cut amplification unit that cuts DC components from a voltage signal and amplifies AC components in the voltage signal.

The first conversion unit 11 has a light-receiving element (not shown). The light-receiving element converts received illumination light into an electric signal. The illumination light according to Embodiment 1 is visible light emitted by the illumination device 20. According to Embodiment 1, the illumination light does not include sub-carrier waves, and has an intensity that increases and decreases according to modulated signals. The modulated signals have a modulated part in each of predetermined symbol time periods, thereby expressing the ID information. The first conversion unit 11 provides the amplification unit 12 with a voltage signal Jm that varies according to the intensity of the received illumination light. It should be noted in Embodiment 1 that a width of a unit pulse included in a modulated signal is defined as a slot time period. More specifically, a time period having four slot time periods is defined as one symbol time period.

Furthermore, the amplification unit 12 cuts DC components from the voltage signal Jm provided from the first conversion unit 11. As a result, DC components corresponding to disturbance light that has a certain intensity are cut from a voltage signal included in the voltage signal Jm. As described above, the amplification unit 12 is used to cut DC components, thereby cancelling noise components from the voltage signal, in addition to the cutting of DC components from the voltage signal Jm, the amplification unit 12 amplifies AC components in the voltage signal Jm based on a predetermined gain. As described above, when the amplification unit 12 is used to amplify AC components in the voltage signal Jm, it is possible to more easily detect a voltage signal that depends on ID information. The amplified AC components in the voltage signal Jm are provided as an output signal Km to the microcomputer 13.

The microcomputer 13 includes a second conversion unit 14, a first calculation unit 15, a second calculation unit 16, a detection unit 17, a third calculation unit 18, and a fourth calculation unit 19. Here, the second conversion unit 14 is an example of an AD conversion unit. The first calculation unit 15 is an example of a difference calculation unit. The second calculation unit 16 is an example of a reference calculation unit. The detection unit 17 is an example of a point detection unit. The third calculation unit 18 is an example of an interval calculation unit. The fourth calculation unit 19 is an example of a demodulation calculation unit.

The second conversion unit 14, which is an example of the AD conversion unit, performs AD conversion for each predetermined sampling time duration Ts to convert an output signal Km of the amplification unit 12 into an AD-converted value, and provides the resulting AD-converted value to the first calculation unit 15. Here, the output signal Km is an analog signal and the AD-converted value is a digital signal.

The first calculation unit 15 calculates a difference between the AD-converted values generated at respective different sampling points. Then, the first calculation unit 15 provides the second calculation unit 16 with the difference generated by the difference calculation as a difference digital value.

The second calculation unit 16 extracts continuous difference digital values in four or more symbol time periods, and calculates a peak value (or an absolute peak value) among the extracted difference digital values. Then, the second calculation unit 16 provides the detection unit 17 with (a) a reference value to be used for positive values (hereinafter, referred to as a "positive reference value") which is determined according to a peak value (or an absolute peak value) as a positive value, and (b) a reference value to be used for negative values (hereinafter, referred to as a "negative reference value") which is determined according to a peak value (or an absolute peak value) as a negative value.

It should be noted that a peak value refers to an extreme value (partially prominent value) among extracted difference digital values, and that an absolute peak value refers to an extreme value among absolute values of extracted difference digital values. The positive reference value in Embodiment 1 is, for example, a value that is generated by adding roughly one third of a maximum value of a peak value (or, absolute peak value) to a predetermined value. The negative reference value is, for example, a value that is generated by multiplying a positive reference value by −1. It should be noted that the predetermined value is a positive value including zero. The predetermined value may be zero.

From among all rising points and falling points in the temporal sequence, the detection unit 17 detects rising points and falling points which alternately appear in the temporal sequence as selected rising points and selected falling points. Here, in Embodiment 1, a time from when successive difference digital values each greater than the positive reference value appear is determined as a rising point, and a time from when successive difference digital values each smaller than the negative reference value appear is determined as a falling point. Then, the detected selected rising points and the detected selected falling points are provided to the third calculation unit 18.

The third calculation unit 18 detects a first sample period that is a "level-1 sample number". The first sample period consists of sampled difference digital values in a period from a target selected rising point to a selected falling point immediately subsequent to the target selected rising point. Likewise, the third calculation unit 18 detects a second sample period that is a "level-0 sample number". The second sample period consists of sampled difference digital values in a period from the selected falling point to another selected rising point immediately subsequent to the selected falling point. Then, the detected level-1 sample number and level-0 sample number are provided to the fourth calculation unit 19.

The fourth calculation unit 19 calculates a demodulated code (demodulated signal) for each of symbol time periods, based on a first sample period (level-1 sample number) and a second sample period (level-0 sample number) which appear alongside each other in the temporal sequence in the symbol time period. Thereby, the demodulated signals that have been generated according to the output signal Km of the amplification unit 12 are outputted from the microcomputer 13. Based on the demodulated signals, the receiving device 10 detects a position of the receiving device 10.

The illumination device 20, which is a visible light transmitting device, includes a driving unit 21 and an illumination unit 22.

The driving unit 21 is an example of a position modulation driving unit, and generates modulated signals having ID information. The driving unit 21 according to Embodiment 1, for example, does not use sub-carrier waves, and generates, by 4 Pulse Position Modulation (4 PPM), modulated signals having a modulated part in each of symbol time periods to express the ID information.

The illumination unit 22 changes an intensity of the illumination light according to the modulated signals of the driving unit 21. The illumination unit 22 includes a white Light-Emitting Diode (LED), and increases and decreases an amount of white visible light according to the modulated signals. A cycle of changing the light amount is, for example, approximately 1 kHz. Here, the illumination unit 22 may include a color visible light LED, such as a red LED or a blue LED.

In general, near the illumination device 20, there is often a disturbance light source 25, such as fluorescent lighting or a display device, which emits pulsed disturbance light.

Here, the situation where the visible light communication system according to Embodiment 1 is used is considered.

The receiving device 10 receives illumination light from the illumination device 20 in the place where the receiving device 10 is used, and also receives disturbance light from the disturbance light source 25 near the place.

When the illumination light and the disturbance light are received, the first conversion unit 11 in the receiving device 10 outputs a voltage signal Jm. The voltage signal Jm varies depending on an amount of received visible light, such as received illumination light and received disturbance light.

The amplification unit 12 that receives the voltage signal Jm outputs an amplified signal Km. The amplified signal Km is a signal generated by amplifying AC components in the voltage signal Jm of the first conversion unit 11 based on a predetermined gain.

As shown in FIG. 2B, the microcomputer 13 performs an ID detection step (the twelfth step described later) that includes the first step S01 that is an AD conversion step described later, the second step S02 that is a difference calculation step, the third step S03 that is a reference calculation step, the fourth step S04 that is a point detection step, the fifth step S05 that is an interval calculation step, and the sixth step S06 that is a demodulation calculation step. The microcomputer 13 performs the first step S01 to the sixth step S06 to apply AD conversion on the amplified signal of the amplification unit 12, thereby demodulating the signal.

As described above, the receiving device 10 according to Embodiment 1 can demodulate the ID information of the illumination device 20 with a high accuracy, even if a communication distance between the receiving device 10 and the illumination device 20 changes.

The ID information can be demodulated with a high accuracy, because, in Embodiment 1, even if the voltage signal Jm of the first conversion unit 11, which is a received signal, which is changed according to a change of the communication distance between the receiving device 10 and the illumination device 20, is changed, influence of the change to the demodulation of the ID information is small. Therefore, without using Automatic Gain Control (AGC) which the conventional visible light receiving devices need, the receiving device 10 according to Embodiment 1 is capable of dealing with the situation where an amount of received light significantly changes.

Furthermore, the receiving device 10 according to Embodiment 1 has the characteristic steps performed by the microcomputer 13, so as to deal even with pulsed disturbance light of the disturbance light source 25.

The following describes the structure, the processing, and the effects of the receiving device 10 shown in FIG. 1 with reference to (a) to (d) in FIG. 3.

In (a) in FIG. 3, a solid line shows illumination light Lm of the illumination device 20, and a broken line shows pulsed disturbance light Dt. In (b) in FIG. 3, a solid line shows a voltage signal Jm of the illumination light Lm, and a broken line shows a voltage signal Jmd of the disturbance light Dt. In (c) in FIG. 3, a solid line shows an amplified signal Km of the illumination light Lm, and a broken line shows an amplified signal Kmd of the disturbance light Dt. In (d) in FIG. 3, a rising point Rm and a falling point Fm are shown. In each of (a) to (d) in FIG. 3, a horizontal axis shows a time and a vertical axis shows an intensity of each signal.

In the visible light communications, ID information having a predetermined code length is expressed by modulated signals in continuous symbol time periods. In order to express the ID information, the illumination device 20 in the visible light communications emits visible light by changing an intensity of the visible light according to the modulated signals.

Here, as shown in (a) in FIG. 3, the driving unit 21 in the illumination device 20 shown in FIG. 1 generates a 4 PPM-modulated signal per single symbol time period "By", and supplies the modulated signal to the illumination unit 22. A single symbol time period By includes four slot time periods (slot time periods C1, C2, C2, and C4). A 4 PPM-modulated signal is a signal generated by modulating a certain pulsed slot time period that is a temporal position in a single symbol time period By.

For example, in (a) in FIG. 3, in a symbol time period By1 that is the first symbol time period from the left, the fourth slot time period (slot time period C4) is modulated. In a symbol time period By2 that is the second symbol time period from the left, the second slot time period (slot time period C2) is modulated. In a symbol time period By3 that is the third symbol time period from the left, the first slot time period (slot time period C1) is modulated. In a symbol time period By4 that is the fourth symbol time period from the left, the third slot time period (slot time period C3) is modulated.

The illumination unit 22 in the illumination device 20 shown in FIG. 1 emits illumination light of visible light having an intensity changed according to the modulated signals. As a result, based on the ID information, the illumination device 20 emits illumination light having a low intensity in a certain slot time period per symbol time period By. The intensity of the emitted illumination light is lower than an intensity of illumination light in any other slot time periods among four continuous slot time periods C1, C2, C3, and C4 in the same symbol time period By.

For example, in the case of a code "00" in the ID information, illumination light having a low intensity is emitted in a slot time period C1 in a target symbol time period to express the code. In the case of a code "01" in the ID information, illumination light having a low intensity is emitted in a slot time period C2 in a target symbol time period to express the code. In the case of a code "10" in the ID information, illumination light having a low intensity is emitted in a slot time period C3 in a target symbol time period to express the code. In the case of a code "11" in the ID information, illumination light having a low intensity is emitted in a slot time period C4 in a target symbol time period to express the code.

It should be noted in Embodiment 1 that the modulated signals are not generated from high-frequency sub-carrier waves.

It should also be noted that the illumination light of the illumination device 20 according to Embodiment 1 is synthetic light of (a) an intensity changing part La (a part where a signal intensity changes according to modulated signals) and (b) a fixed part Lb (a part where a signal intensity is fixed).

In other words, as shown by the solid line in (a) in FIG. 3, the illumination light Lm of the illumination device 20 that is received by the receiving device 10 is synthetic light of an intensity changing part La and a fixed part Lb. Moreover, since the disturbance light source 25 emits pulsed disturbance light, as shown by the broken line in (a) in FIG. 3, the disturbance light Dt that is emitted from the disturbance light source 25 and received by the receiving device 10 is pulsed light.

The first conversion unit 11 in the receiving device 10 outputs a voltage signal Jm corresponding to an amount of light received by a light-receiving element (not shown).

(b) in FIG. 3 shows the voltage signal Jm provided from the first conversion unit 11. The light-receiving element in the first conversion unit 11 superimposes the illumination light Lm of the illumination device 20 and the disturbance light Dt of the disturbance light source 25 on each other to be received. As a result, the voltage signal Jm that varies depending on the synthetic light amount of both lights is obtained. Therefore, the voltage signal Jm shown in (b) in FIG. 3 is a synthetic signal of an influenced part of the illumination light Lm and an influenced part of the disturbance light Dt (Jmd part in (b) in FIG. 3).

The amplification unit 12 in the receiving device 10 cuts (or completely removes) DC components from the voltage signal Jm received from the first conversion unit 11, and amplifies AC components in the voltage signal Jm based on a predetermined fixed gain. Then, the amplification unit 12 outputs the resulting amplified signal Km.

(c) in FIG. 3 shows the amplified signal Km. The amplified signal Km shown in (c) in FIG. 3 has a signal waveform where AC components in the voltage signal Jm are inverted and amplified based on a predetermined fixed gain. Therefore, the amplified signal Km is a synthetic signal of an influenced part of the illumination light Lm and an influenced part of the disturbance light Dt (Kmd part in (c) in FIG. 3). The amplified signal Km provided from the amplification unit 12 is provided to the microcomputer 13. It is also possible that the amplification unit 12 significantly reduces influence of DC components in the voltage signal Jm of the first conversion unit 11, instead of completely removing the DC currents. In other words, the expression "to cut" according to the Embodiment 1 means also to reduce significantly.

The amplified signal Km provided to the microcomputer 13 is processed by the microcomputer 13 in the receiving device 10 as follows.

The microcomputer 13 repeats the steps in the flowchart of FIG. 2B, for a predetermined time interval or for each trigger caused by the user. More specifically, the processing performed by the microcomputer 13 includes the first step (AD conversion step) S01, the second step (difference calculation step) S02, the third step (reference calculation step) S03, the fourth step (point detection step) S04, the fifth step (interval calculation step) S05, and the sixth step (demodulation calculation) S06. The microcomputer 13 performs these steps sequentially or a part of the steps in parallel.

Here, the first step S01 is an example of the AD conversion step. At the first step S01, the second conversion unit 14 performs AD conversion on the amplified signal Km provided from the amplification unit 12 for each predetermined sampling time duration Ts, thereby obtaining an AD-converted value.

Here, the second step S02 is an example of the difference calculation step. At the second step S02, the first calculation unit 15 performs difference calculation by using the AD-converted values obtained at a plurality of sampling points, thereby calculating a difference digital value between each pair among the AD-converted values.

Here, the third step S03 is an example of the reference calculation step. At the third step S03, the second calculation unit 16 extracts difference digital values in continuous four or more symbol time periods, and calculates a positive reference value and a negative reference value according to a peak value (or an absolute peak value) among extracted difference digital values.

The fourth step S04 is an example of the point detection step. At the fourth step S04, from among all rising points and falling points which appear in the temporal sequence, the detection unit 17 detects rising points and falling points which alternately appear as selected rising points and selected falling points.

The fifth step S05 is an example of the interval calculation step. At the fifth step S05, the third calculation unit 18 detects level-1 sample numbers and level-0 sample numbers.

The sixth step S06 is an example of the demodulation calculation step. At the sixth step S06, for each symbol time period, the fourth calculation unit 19 calculates a modulated code based on a level-1 sample number and a level-0 sample number which appear alongside each other in the temporal sequence in the target symbol time period.

The following describes each of the above-described steps in more detail.

First, the first step S01 is described. At the first step S01, for each predetermined sampling time duration Ts, the second conversion unit 14 performs AD conversion on an amplified signal Km that is an input analog signal, thereby generating a digitalized AD-converted value. Eventually, the second conversion unit 14 obtain such digitalized AD-converted values for a predetermined time length. Here, in Embodiment 1, a sampling time duration Ts is set to be much shorter than a symbol time period By. The predetermined time length is set to be long enough to include the ID information of the illumination device 20. The second conversion unit 14 stores the AD-converted values in the temporal sequence which have been converted by the second conversion unit 14, into a memory (not shown) that is an example of a storage unit, if necessary.

Subsequently, the second step S02 is described. At second step S02, the first calculation unit 15 performs difference calculation on the AD-converted values obtained at respective sampling points, thereby generating difference digital values for the respective sampling points. Then, the first calculation unit 15 stores the difference digital values in the temporal sequence into the memory. More specifically, the first calculation unit 15 calculates a difference between (a) an AD-converted value at a target sampling point and (b) an AD-converted value at another sampling point that is the second sampling point before the target sampling point, and then stores the calculated difference into the memory as a difference digital value at the target sampling point. As described above, sampling points are sequentially selected to calculate a difference digital value for each of the sampling points, thereby generating difference digital values in the temporal sequence. The first calculation unit 15 stores the difference digital values in the temporal sequence into the memory, as needed. At the second step S02, sampling points are sequentially selected to calculate a difference digital value for each of the sampling points, thereby generating difference digital values in the temporal sequence.

Subsequently, the third step S03 is described. At the third step S03, the second calculation unit 16 extracts difference digital values in continuous four or more symbol time periods, and determines a positive reference value and a negative reference value according to a peak value (or absolute peak value) among the extracted difference digital values. It is also possible at the third step S03 that a predetermined value is set to a large positive value so that the ID information cannot be demodulated when the difference digital values in the temporal sequence are smaller than the predetermined value. It is still possible at the third step S03 that the second calculation unit 16 determines the positive reference value and the negative reference value according to an average value of peak values (or absolute peak values) among the extracted difference digital values. Thereby, even if the intensity of the illumination light Lm is decreased (or increased), it is possible to easily determine the reference values that vary depending on an intensity of modulated signals included in the illumination light Lm. As a result, it is possible to stably detect rising points and falling points at the fourth step S04. In other words, the third step S03 allows the fourth step S04 to be performed stably, even if an average value of the illumination light Lm is increased a hundred times.

Next, the fourth step S04 is described. At the fourth step S04, the detection unit 17 detects rising points and falling points. Here, a rising point is a time from when successive difference digital values each greater than the positive reference value appear in the temporal sequence, and a falling point is a time from when successive difference digital values each smaller than the negative reference value appear in the temporal sequence.

In (d) in FIG. 3, a rising point Rm and a falling point Fm are shown. For example, the disturbance light Dt of the disturbance light source 25 causes a falling point Fn+1 and a rising point Rn+1. The detection unit 17 detects rising points and falling points which alternately appear as selected rising points and selected falling points, from among all rising points and falling points in the temporal sequence. For example, even if rising points successively appear or falling points successively appear, a selected rising point and a selected falling point are detected to be alongside each other in the temporal sequence.

Here, at the fourth step S04, if two falling points appear successively in the temporal sequence, the detection unit 17 does not detect the second falling point in the two falling points as a selected falling point, and does not detect a rising point immediately subsequent to the second falling point as a selected rising point. In other words, the detection unit 17 excludes the second falling point and the rising point immediately subsequent to the second falling point from targets to be detected. Likewise, at the fourth step S04, when two rising points appear successively in the temporal sequence, the detection unit 17 does not detect the second rising point in the two rising points as a selected rising point, and does not detect a falling point immediately subsequent to the second rising point as a selected falling point. In other words, the detection unit 17 excludes the second rising point and the falling point immediately subsequent to the second rising point from targets to be detected. As a result, it is possible to remove the falling point Fn+1 and the rising point Rn+1 which have been caused by the disturbance light. Here, a rising point refers to a sampling point having the first difference digital value among successive difference digital values each greater than the positive reference values in the temporal sequence. A falling point refers to a sampling point having the first difference digital value among successive difference digital values each smaller than the negative reference value in the temporal sequence.

Next, the fifth step S05 is described. At the fifth step S05, the third calculation unit 18 detects level-1 sample numbers and level-0 sample numbers. Here, it is assumed at the fifth step S05 that a level-1 sample number is the number of difference digital value samples in a period from a target selected rising point to a selected falling point immediately subsequent to the target selected rising point, and that a level-0 sample number is the number of difference digital value samples in a period from the selected falling point to a selected rising point immediately subsequent to the selected falling point.

Next, the sixth step S06 is described. At the sixth step S06, for each symbol time period, the fourth calculation unit 19 calculates a modulated code based on a level-1 sample number and a level-0 sample number which appear alongside each other in the temporal sequence in a target symbol time period. The fourth calculation unit 19 detects the ID information based on such demodulated codes of the respective symbol time periods. It is thereby possible to recognize the illumination device 20 having the ID information which the receiving device 10 has received. As a result, a position of the receiving device 10 can be detected. It should be noted, at the sixth step S06, that the fourth calculation unit 19 may detect a start block code added to the ID information to find the first symbol time period of symbol time periods including modulated codes of the ID information.

As described above, the receiving device 10 according to the present embodiment can stably detect the ID information of the illumination device 20 that is a visible light transmitting device, with a simple structure not including a complicated circuit such as an Automatic Gain Control (AGC). It is thereby possible to manufacture the receiving device 10 as a module and integrate the module into a small and light-weighted mobile terminal (for example, a smartphone), or connect the module to a smartphone or the like as an attachment.

Here, for example, the situation where a user keeps holding such a mobile terminal is considered. Under the situation, an amplitude of an amplified signal Km of the amplification unit 12 significantly changes in a range from, for example, 50 mV to 5000 mV according to a communication distance between the illumination device 20 as the receiving device 10 which is held by the user. However, in Embodiment 1, the microcomputer 13 performs the series of the steps from the first step S01 to the sixth step S06, so that the receiving device 10 can receive and demodulate the ID information of the illumination device 20 with a high accuracy. In other words, the receiving device 10 according to Embodiment 1 can perform normal demodulation operation, even if a level of a received visible light signal significantly changes. For example, if a level of a received signal is increased a hundred times, the change is equivalent to approximately ten times of the communication distance. Using the above characteristics, the receiving device 10 according to Embodiment 1 has the structure suitable for the situation where a communication distance in visible light communications significantly changes, for example, the situation where the receiving device 10 is applied to a mobile terminal or the like which receives visible light illumination from the illumination device 20.

Furthermore, the amplification unit 12 according to Embodiment 1 merely cuts (or significantly reduces) DC components in the voltage signal Jm. Therefore, a response delay caused by the DC components in the voltage signal Jm hardly occurs. Therefore, for example, even if a visible light communication path between the receiving device 10 and the illumination device 20 is blocked, the receiving device 10 can immediately receive and demodulate a visible light signal without a delay when the communication path is restored. As a result, the receiving device 10 according to Embodiment 1 has the structure suitable for the situation where a visible light communication path is often blocked and restored, for example, the situation where the receiving device 10 is applied to a mobile terminal or the like that receives visible light illumination from the illumination device 20.

It should be noted that the receiving device 10 according to Embodiment 1 has the structure suitable for detecting the ID information of a visible light illumination device, such as the illumination device 20, but the present invention is not limited to the structure. For example, it is also possible to provide a visible light communication system that includes the receiving device 10 according to Embodiment 1 in order to offer spatial signal transmission.

It should also be noted, in the receiving device 10 and the illumination device 20, a modulated signal is not limited to have four slot time periods in one symbol time period, but may have three or five slot time periods in one symbol time period.

It should also be noted it has been described in Embodiment 1 that the microcomputer 13 sequentially performs the first step S01 to the sixth step S06, but the processing performed by the microcomputer is not limited to the above. In other words, the microcomputer 13 according to Embodiment 1 may perform a part of the steps in parallel, or perform only necessary calculation steps. For example, it is also possible to perform the second step S02, the third step S03, and the fourth step S04 in parallel to obtain rising points and falling points without storing difference digital values in the temporal sequence.

It should also be noted that it has described that one of detected successive two rising points (or detected successive two falling points) is outputted at the fourth step, the present invention is not limited to the above. For example, it is also possible that, when successive two rising points (or detected successive two falling points) are detected, the detection unit 17 may perform subsequent demodulation processing in the microcomputer 13.

It should also be noted that the microcomputer 13 according to Embodiment 1 detects, at the fourth step S04, rising points and falling points which alternately appear in the temporal sequence as selected rising points and selected falling points, so that the demodulated codes and the ID information can be detected with a high accuracy even if pulsed disturbance light noise is included.

It should also be noted that it has been described at the fourth step S04 that a pair of a rising point and a falling point which have been caused by disturbance light noise is removed, but the present invention is not limited to the above. The following describes a variation of the detection unit 17.

Variation of Embodiment 1

The following describes a variation of Embodiment 1. (a) to (d) in FIG. 4 are waveform charts for explaining operations of a visible light receiving device according to the present variation.

The description is given for operations of the detection unit 17 at the fourth step S04 according to the present variation. When the detection unit 17 detects two successive falling points in the temporal sequence, the detection unit 17 (i) measures the first sample number from (a) a rising point immediately prior or subsequent to the two successive falling points to (b) the first falling point in the two successive falling points, and (ii) measures the second sample number from (a) the rising point immediately prior or subsequent to the two successive falling points to (c) the second falling point in the two successive falling points. Then, based on the first sample number and the second sample number, the detection unit 17 detects one of the two successive falling points as a selected falling point. On the other hand, when the detection unit 17 detects two successive rising points in the temporal sequence, the detection unit 17 (i) measures the first sample number from (a) a falling point immediately prior or subsequent to the two successive rising points to (b) the first rising point in the two successive rising points, and (ii) measures the second sample number from (a) the falling point immediately prior or subsequent to the two successive rising points to (c) the second rising point in the two successive rising points. Then, based on the first sample number and the second sample number, the detection unit 17 detects one of the two successive rising points as a selected rising point.

The above processing is described in more detail with reference to (a) to (d) in FIG. 4. In (a) in FIG. 4, a solid line shows illumination light Lm of the illumination device 20, and a broken line shows pulsed disturbance light Dt. In (b) in FIG. 4, a solid line shows a voltage signal Jm of the illumination light Lm, and a broken line shows a voltage signal Jmd of the disturbance light Dt. In (c) in FIG. 4, a solid line shows an amplified signal Km of the illumination light Lm, and a broken line shows an amplified signal Kmd of the disturbance light Dt. In (d) in FIG. 4, a rising point Rm and a falling point Fm are shown. In each of (a) to (d) in FIG. 4, a horizontal axis shows a time and a vertical axis shows an intensity of each signal.

Figure 4:
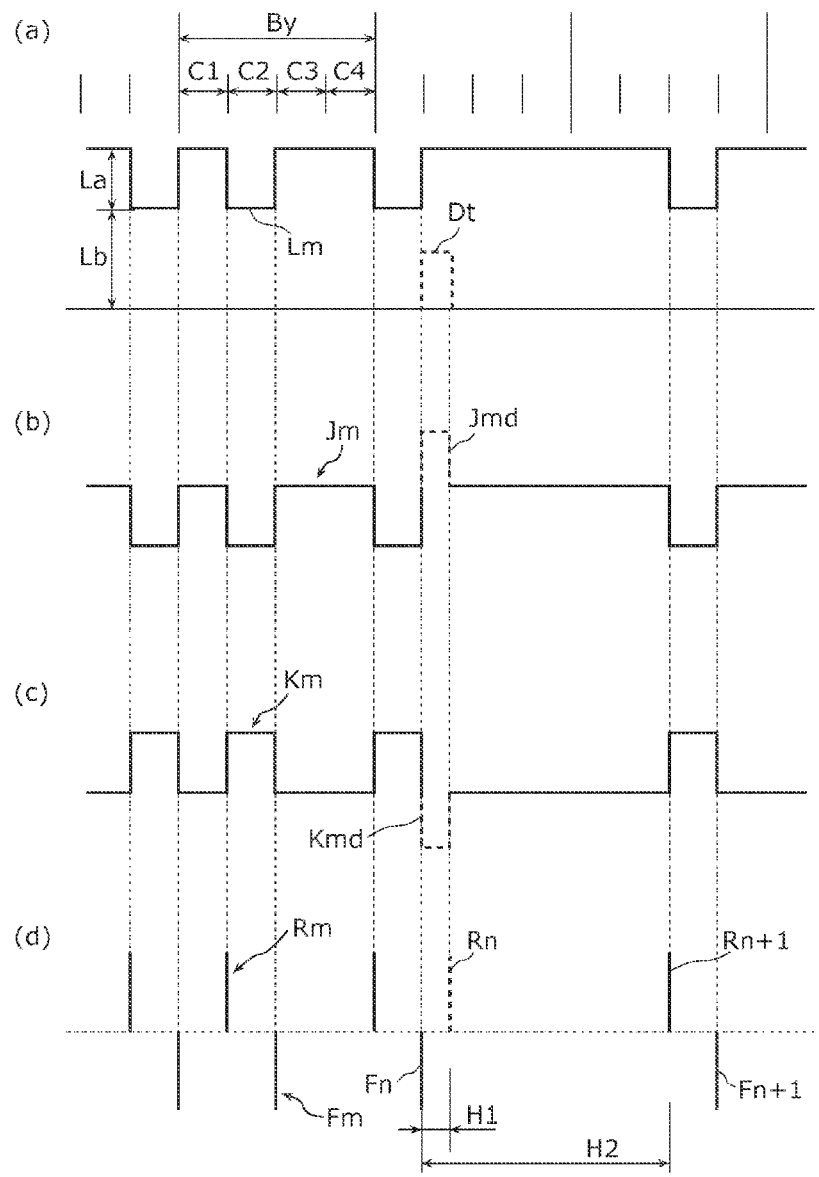
FIG. 4 is a waveform chart for explaining operations of a receiving device according to a variation of Embodiment 1.

If the disturbance light Dt of the disturbance light source 25 which is shown in (a) in FIG. 4 is mixed to the amplified signal Km, influence Kmd of the disturbance light which is shown in (c) in FIG. 4 is included in the amplified signal Km. Therefore, the rising point Rn and the falling point Fn appear as shown in (d) in FIG. 4.

In this example, as shown in (d) in FIG. 4, two rising points Rn and Rn+1 appear successively in the temporal sequence. With reference to a falling point Fn immediately prior to a rising point Rn, the number of slot time periods (namely, sample points in an interval from the falling point Fn to the rising point Rn which is the first rising point from the falling point Fn is counted as a first sample number H1. Likewise, the number of slot time periods (sampling points) in an interval from the falling point Fn to the rising point Rn+1 which is the second rising point from the falling point Fn is counted as a second sample number H2.

Here, the first sample number H1 is closer to an integral multiple of a slot time period, than the second sample number H2. Furthermore, the first sample number H1 is shorter than one slot time period. Therefore, the detection unit 17 determines that the rising point Rn corresponding to the first sample number H1 is influenced by the disturbance light, and therefore does not detect the rising point Rn as a selected rising point. In other words, the detection unit 17 removes the rising point Rn from targets to be detected. The detection unit 17 detects the rising point Rn+1 corresponding to the second sample number H2 as a selected rising point. By the above way, a signal change caused by the disturbance light is removed at the fourth step S04, which makes it possible at the subsequent fifth step S05 and sixth step S06 to obtain the ID information of the illumination device 20 with a high accuracy. It should be noted that the above method is applicable even if three or more rising points successively appear.

In Embodiment 1, as described above, a selected falling point having a high reliability is used as a reference point to select a subsequent point. However, the present invention is not limited to the above. For example, the falling point Fn+1 immediately subsequent to the rising point Rn+1 may be used as a reference point.

It should be noted that, at the second step S02, the first calculation unit 15 according to Embodiment 1 calculates, as a difference digital value at a target sampling point, a difference between (a) an AD-converted value at the target sampling point and (a) an AD-converted value at another sampling point that is the second sampling point from the target sampling point. In other words, a difference between an AD-converted value at a target sampling point and the second AD-converted from the AD-converted value is calculated as a difference digital value at the target sampling point. Sampling points are sequentially selected as a target sampling point to calculate difference digital values in the temporal sequence. By the above processing, even if the output signal Jm of the amplification unit 12 has waveform distortion, the detection unit 17 can stably and surely detect rising points and falling points at the fourth step. It should be noted that the other sampling point is not limited to the second sampling point from the target sampling point, but may be the third or more sampling point from the target sampling point.

Here, the inventors have found in their experiments that, in the case of using the second step S02 for calculating, as a difference digital value at a target sampling point, a difference between an AD-converted value at the target sampling point and the second AD-converted value from the AD-converted value, the sampling time duration should be restricted at the first step S01 to stably operate the third calculation unit 18 and the fourth calculation unit 19 at the fifth step S05 and the sixth step S06, respectively. More specifically, the inventors have found in their experiments that, if the first calculation unit 15 calculates, as a difference digital value at the target sampling point, a difference between (a) an AD-converted value at the target sampling point and (b) an AD-converted value at the second or more sampling point from the target sampling point, it is effective that a sampling time duration Ts is set to be equal to or shorter than one twelfth of a symbol time period By. For example, in the experiments of the inventors, provided that a visible light signal does not include noise, a probability of obtaining the ID information from the received visible light signal is almost 100% when a sampling time duration Ts is equal to or shorter than one twelfth of a symbol time period By, but 50% to 60% when a sampling time duration Ts is longer than one twelfth of a symbol time period By. It should be noted that, in Embodiment 1 and the present variation, a sampling time duration Ts is set to approximately one twentieth of a symbol time period By. With this, at the fifth step S05 and the sixth step S06, the third calculation unit 18 and the fourth calculation unit 19, respectively, can perform their processing more stably, and can demodulate the ID information more stably.

Embodiment 2

Next, Embodiment 2 according to the present invention is described.

Figure 5:
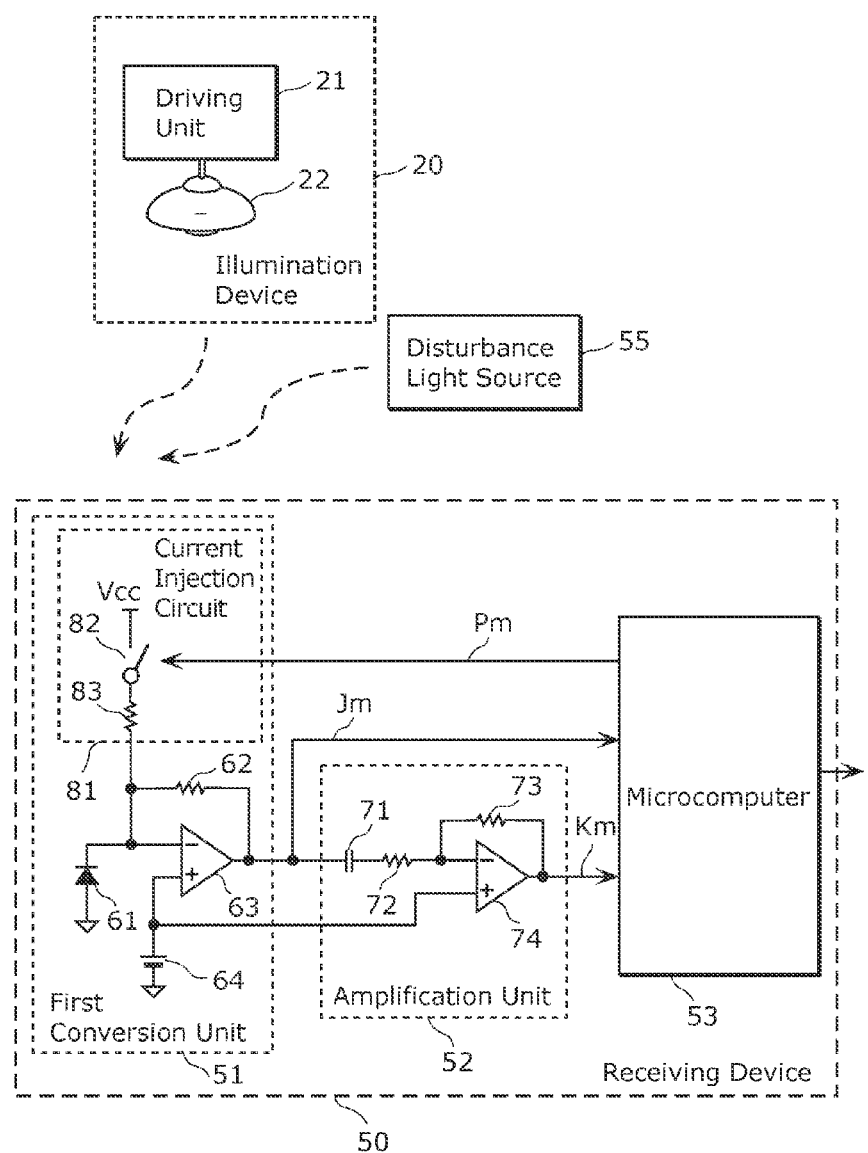
FIG. 5 is a configuration diagram of a visible light communication system including a receiving device according to Embodiment 2.
Figure 6:
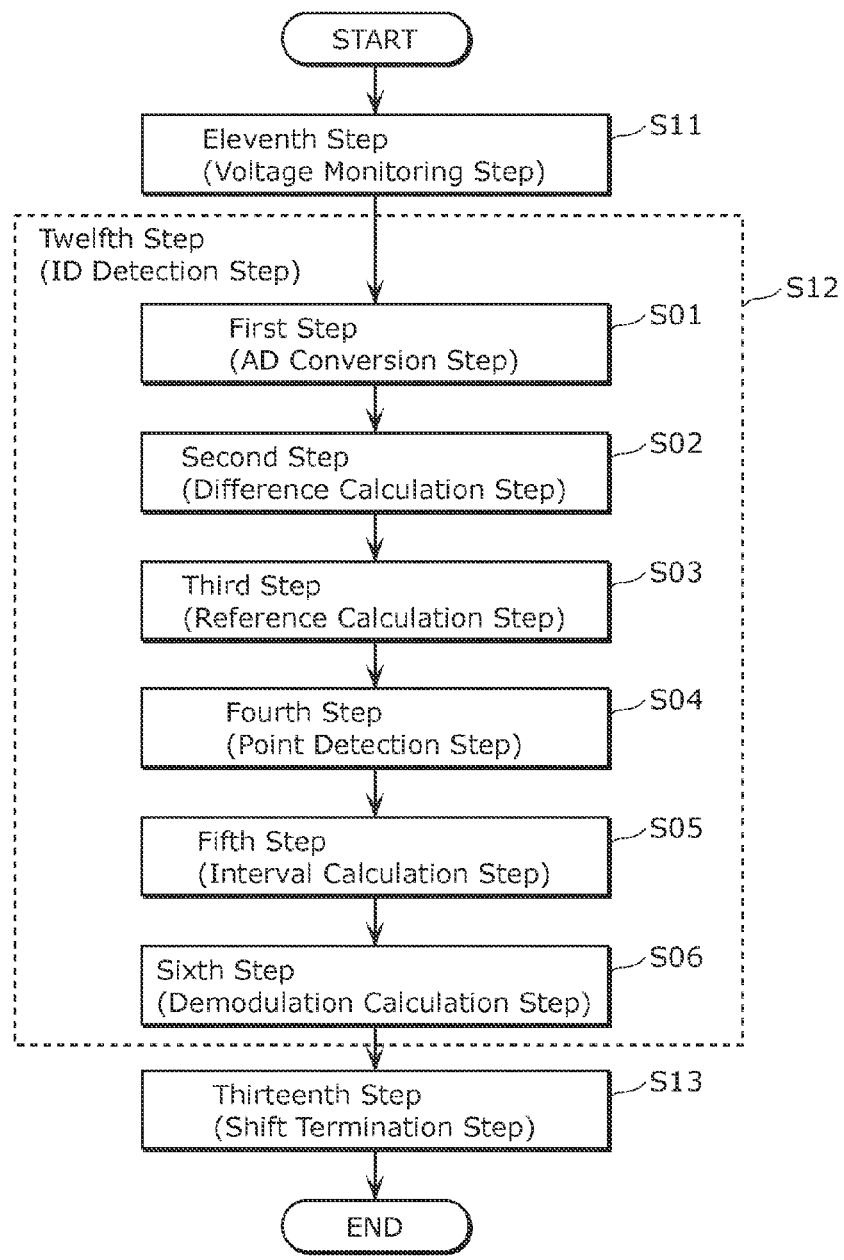
FIG. 6 is a flowchart of steps in processing performed by a microcomputer unit according to Embodiment 2.
Figure 7:
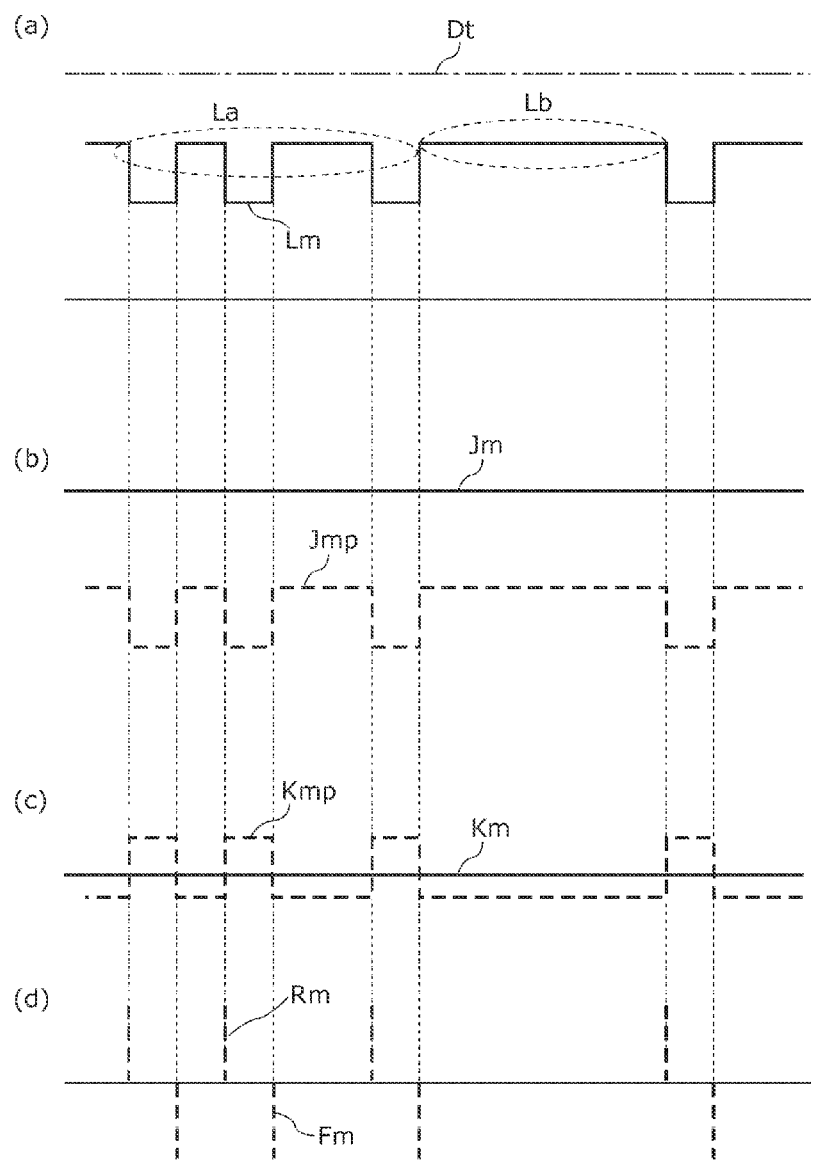
FIG. 7 is a waveform chart for explaining operations of a receiving device according to Embodiment 2.

FIG. 5 is a configuration diagram of a visible light communication system including a receiving device 50 according to Embodiment 2. FIG. 6 is a flowchart of steps in processing performed by a microcomputer 53. (a) to (d) in FIG. 7 are waveform charts for explaining operations of the receiving device 50.

The receiving device 50 according to Embodiment 2 avoid influence of a disturbance light source 55, such as sun light or fluorescent light. Therefore, even if the illumination device 20 emits a quite small amount of light in comparison to a large light amount of the disturbance light source 55, the receiving device 50 can detect the ID information with a high accuracy.

As shown in FIG. 5, a visible light communication system according to Embodiment 2 includes an illumination device 20 and a receiving device 50. The illumination device 20 is an example of a visible light communication device (visible light transmitting device). The illumination device 20 is the same as the illumination device 20 described in the above-described Embodiment 1, so that it will not be described in detail.

The receiving device 50 includes a first conversion unit 51, an amplification unit 52, and a microcomputer 53. The microcomputer 53 is the same as the microcomputer 13 described in the above-described Embodiment 1, so that it will not be described in detail.

The first conversion unit 51 includes a light-receiving element 61, an amplifier, and a current injection circuit 81. The light-receiving element 61 converts visible light, such as illumination light and disturbance light, into an electric signal. The amplifier includes a resistance 62, an operational amplifier 63, and a DC power source 64. The first conversion unit 51 generates a voltage signal Jm proportional to an absorbed current of the light-receiving element 61, by using the amplifier (the resistance 62, the operational amplifier 63, and the DC power source 64).

The visible light received by the light-receiving element 61 is converted into an electric signal. Here, the visible light is illumination light or disturbance light, and has an intensity that increases and decreases according to modulated signals that have a modulated part in each of predetermined symbol time periods in order to express the ID information. The electric signal provided from the light-receiving element 61 is amplified by the amplifier (the resistance 62, the operational amplifier 63, and the DC power source 64). The first conversion unit 51 provides the amplification unit 52 with a voltage signal Jm that varies according to the intensity of the illumination light received by the light-receiving element 61.

The current injection circuit 81 includes a switch 82 and a resistance 83. The current injection circuit 81 turns the switch 82 OFF to allow a DC current to be supplied from a power source Vcc to the operational amplifier 63. More specifically, the current injection circuit 81 turns the switch 82 ON according to a shift indication signal Pm provided from the microcomputer 53, thereby causing a predetermined DC current to flow into the light-receiving element 61 via the resistance 83. In other words, when the shift indication signal Pm of the microcomputer 53 is ON, the current injection circuit 81 allows a DC current to flow into the light-receiving element 61. If the disturbance light is sun light, the power source Vcc is approximately 3 V, for example. The switch 82 in the current injection circuit 81 is an analog switch circuit or a transistor circuit.

The capacitor 71 in the amplification unit 52 cuts DC components from a voltage signal Jm that has been provided from the first conversion unit 51 to the amplification unit 12. The resistance 72, the resistance 73, and the operational amplifier 74 in the amplification unit 52 amplify AC components in the voltage signal Jm based on a predetermined fixed gain. Thereby, an output signal Km of the amplification unit 52 is a signal generated by amplifying AC components in a voltage signal Jm of the first conversion unit 51 based on a predetermined gain. It should be noted that the high-path filter amplification unit 52 is shown as a DC-cut amplification unit, but a band-path amplification unit may also be used. It should also be noted that the amplification unit 52 is not limited to completely cut (remove) DC components from a voltage signal Jm, but may significantly reduce the DC components. In other words, the expression "to cut" in the Embodiment 2 means also to significantly reduce. The amplified AC components in the voltage signal Jm are provided as an output signal Km to the microcomputer 53.

The microcomputer 53 receives the output signal Km from the amplification unit 52 and the voltage signal Jm from the first conversion unit 51.

The illumination device 20 includes a driving unit 21 and an illumination unit 22. Without using sub-carrier waves, the driving unit 21 generates modulated signals having a modulated part in each of predetermined symbol time periods to express the ID information. The illumination unit 22 changes an intensity of the illumination light according to the modulated signals of the driving unit 21.

In general, near the illumination device 20, there is sometimes a disturbance light source 55, such as sun light or an incandescent ramp, which emits disturbance light having a large light amount.

In (a) in FIG. 7, a solid line shows illumination light Lm of the illumination device 20 provided in a place where there is the light-receiving element 61 of the first conversion unit 51 in the receiving device 50, and a chain line shows disturbance light Dt of the disturbance light source 55. In (b) in FIG. 7, a broken line shows a voltage signal Jmp of the illumination light Lm, and a solid line shows a voltage signal Jm of the disturbance light Dt. In (c) in FIG. 7, a broken line shows an amplified signal Kmp of the illumination light Lm, and a solid line shows an amplified signal Km of the disturbance light Dt. In (d) in FIG. 7, a rising point Rm and a falling point Fm are shown. In each of (a) to (d) in FIG. 7, a horizontal axis shows a time and a vertical axis shows an intensity of each signal.

In the same manner as the illumination device 20 in the above-described Embodiment 1, the illumination light Lm of the illumination device 20 is synthetic light of an intensity changing part La and a fixed part Lb. The disturbance light source 55 emits disturbance light Dt having a high intensity that hardly changes. Therefore, the disturbance light Dt has a light amount that is much greater than a quite small light amount of the illumination light Lm of the illumination device 20. It is assumed here that the disturbance light Dt of the disturbance light source 55 has an intensity that is approximately fifth times as greater as the intensity of the illumination light Lm.

The first conversion unit 51 in the receiving device 50 outputs a voltage signal Jm corresponding to an amount of light received by the light-receiving element 61. (b) in FIG. 7 shows the voltage signal Jm.

The light-receiving element 61 in the first conversion unit 51 superimposes the illumination light Lm of the illumination device 20 and the disturbance light Dt of the disturbance light source 55 on each other to be received. As a result, the voltage signal Jm that varies depending on the synthetic light amount of both lights is obtained. In the conventional visible light receiving devices, if the disturbance light Dt has a significantly large light amount, circuit saturation occurs in the first conversion unit 51. As a result, as shown by the solid line in (b) in FIG. 7, the voltage signal Jm is kept at an upper-limit voltage. In other words, a fixed value (upper-limit voltage) is kept applying as the voltage signal Jm. Therefore, the output signal Km of the amplification unit 52 is kept constant as shown by the solid line in (c) in FIG. 7. In this case, when the microcomputer 53 receives an output signal Km having a fixed value from the amplification unit 52, the microcomputer 53 cannot detect rising points and falling points from such a signal. As a result, it is impossible to receive and demodulate the ID information of the illumination device 20.

In order to address the above situation, the microcomputer 53 in the receiving device 50 according to Embodiment 2 performs the steps shown in the flowchart of FIG. 6. The steps are described.

The microcomputer 53 performs: the eleventh step S11 that is a voltage monitoring step for receiving a voltage signal Jm of the first conversion unit 51 and turning a shift indication signal Pm ON or OFF according to the output voltage Jm of the first conversion unit 51; and the twelfth step S12 that is an ID detection step; and the thirteenth step S13 that is a shift termination step for turning the shift indication signal Pm OF after completing at least the first step S01 (see FIG. 2B). The microcomputer 53 executes the above steps sequentially or a part of the steps in parallel.

The twelfth step S12 is an example of the ID detection step. The twelfth step S12 is performed after the eleventh step S11. Like the ID detection step in Embodiment 1, the twelfth step S12 has the first step S01 to the sixth step S06 (see FIG. 2B).

The microcomputer 53 firstly performs the eleventh step S11. If a voltage signal Jm of the first conversion unit 51 has a higher level than a predetermined level, the microcomputer 53 turns a shift indication signal Pm ON. When the shift indication signal Pm is turned ON, the switch 82 in the current injection circuit 81 in the first conversion unit 51 is turned ON (conductive), thereby causing a predetermined DC current to be supplied from the DC power source Vcc to the light-receiving element 61 via the resistance 83. As a result, a level of DC components in the voltage signal Jm provided from the first conversion unit 51 is changed, thereby generating a voltage signal imp as shown by the broken line in (b) in FIG. 7. More specifically, a DC voltage corresponding to the disturbance light Dt is cancelled by the DC current provided from the current injection circuit 81, and the first conversion unit 51 outputs a voltage signal imp having AC components that vary depending on the illumination light Lm. Accordingly, the amplification unit 52 provides the microcomputer 53 with the AC amplified signal Kmp that varies depending on the illumination light Lm.

When the output signal Km of the amplification unit 52 is received, the microcomputer 53 detects the ID information of the illumination device 20 at the twelfth step S12.

After performing the twelfth step S12, the microcomputer 53 turns the shift indication signal Pm OFF at the thirteenth step S13. Thereby, the current injection circuit 81 turns the switch 82 OFF (non-conductive) according to the shift indication signal Pm, thereby terminating the current injection to the light-receiving element 61. As a result, even if the disturbance light is reduced or is put off in detecting next ID information of the illumination device 20, it is possible to detect the next ID information with a high accuracy.

It should be noted that, at the thirteenth step S13, as long as the shift indication signal Pm is turned OFF after performing the first step S01, it is possible to change an order of performing the steps from the second step S02 to the sixth step S06 in the twelfth step S12 (see FIG. 2B).

As described above, in the receiving device 50 according to Embodiment 2, even if the disturbance light Dt emitted by the disturbance light source 55 has a high intensity, the provision of the current injection circuit 81 can cancel a DC voltage corresponding to the disturbance light Dt by a DC current provided by the current injection circuit 81. As a result, the first conversion unit 51 can output a voltage signal Jmp including AC components that vary depending on the illumination light Lm.

Embodiment 3

Figure 8:
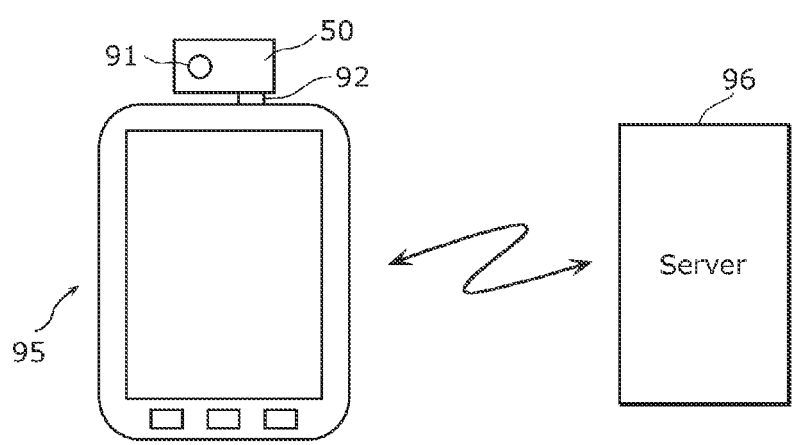
FIG. 8 is a configuration diagram of a position information provision system including a mobile terminal connected to a receiving device according to Embodiment 3.
Figure 9:
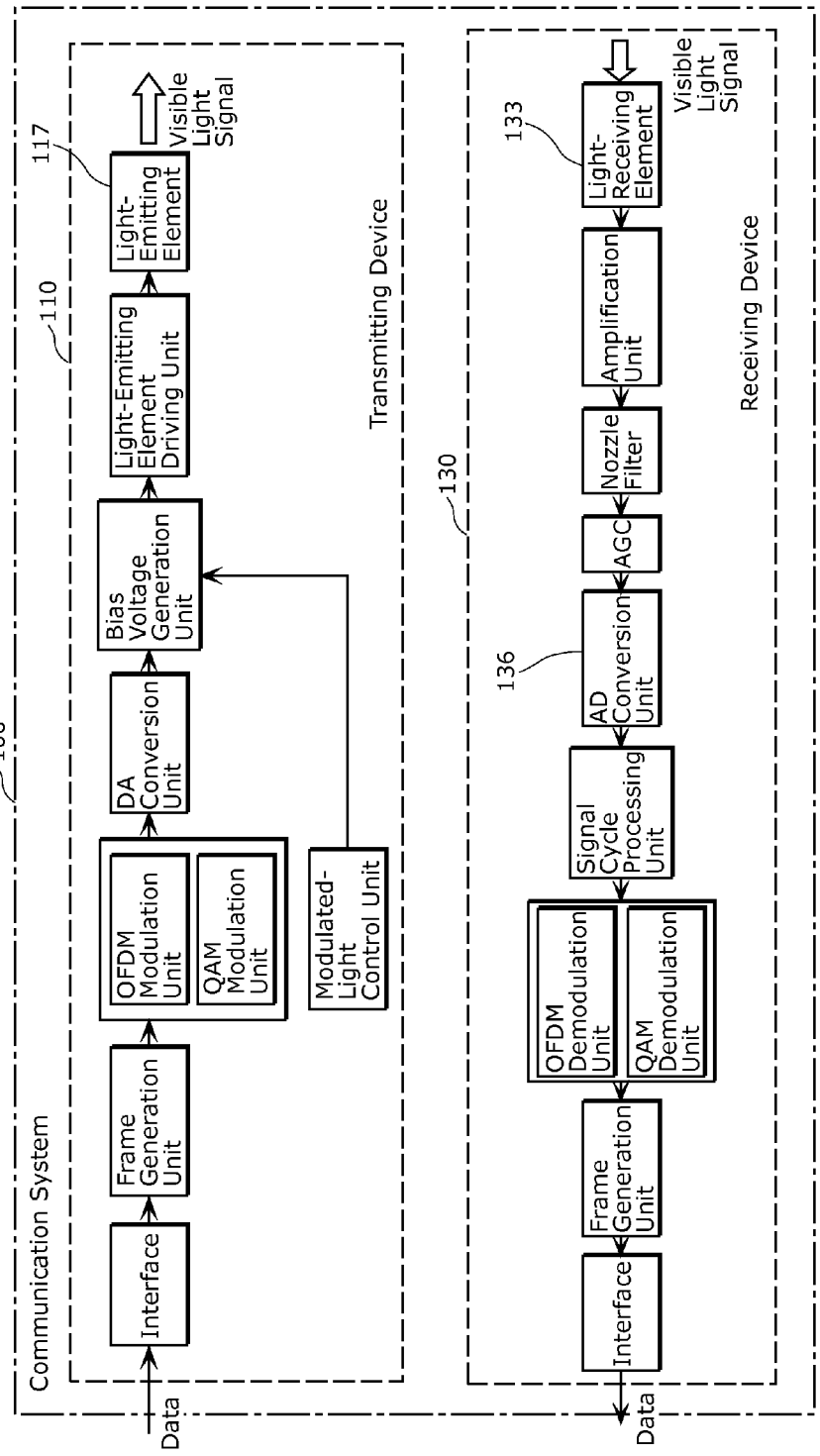
FIG. 9 is a configuration diagram of a conventional communication system.

Next, Embodiment 3 according to the present invention is described. The description is given for a position information system including a visible light receiving device according to Embodiment 3 with reference to FIG. 8. FIG. 8 is a configuration diagram of a position information provision system including a mobile terminal connected to the visible light receiving device according to Embodiment 3. In Embodiment 3, the receiving device 50 according to Embodiment 2 is used as a visible light receiving device. The visible light receiving device is not limited to the receiving device 50 according to the above Embodiment 2, but may be the receiving device 10 according to the above Embodiment 1.

As shown in FIG. 8, the receiving device 50 that manufactured as a module is connected to the mobile terminal 95 as an attachment via a communication connection unit 92. As described above, the mobile terminal 95 is integrated with the receiving device 50. The light-receiving element (not shown) in the receiving device 50 receives visible light illumination by collecting it on a lens 91, and detects a visible light illumination device positioned in a predetermined solid angle.

The communication connection unit 92 is, for example, an Universal Serial Bus (USB) unit that performs USB communications. The receiving device 50 transmits the ID information of the illumination device 20 to the mobile terminal 95 via the communication connection unit 92.

The mobile terminal 95 is, for example, a mobile telephone such as a smartphone, or a tablet PC. The mobile terminal 95 wirelessly inquires a position information server 96 about the received ID information of the illumination device 20.

The server 96, which is an example of the position information server, transmits position information corresponding to the inquired ID information, back to the mobile terminal 95. The mobile terminal 95 causes a screen to display a position of the ID information on a map according to the information given from the server 96.

As described above, the user uses the receiving device 50 connectable to the mobile terminal 95 as an attachment so as to easily be notified of a position of the user in an underground mall or a building. In particular, the receiving device 50 according to Embodiment 3 is capable of stably and speedily detecting the ID information of the illumination device 20. Therefore, the user can use the receiving device 50 even in walking.

It should be noted that, in order to achieve the above object, Embodiment 3 expects the situation where a plurality of the illumination devices 20 having respective different pieces of ID information are provided at respective necessary places in an underground mall or a building. It should also be noted that the communication connection unit 92 connecting the receiving device 50 to the mobile terminal 95 is not limited to the USB unit, but may be a serial communication unit (RS-232C), a wireless communication unit (Bluetooth® or Wi-Fi), or the like.

According to Embodiment 3, the visible light communication system including the above-described receiving device has been described, by using the mobile terminal 95 as an example. In the configuration according to Embodiment 3, the receiving device is capable of stably and speedily detecting the ID information of the illumination device 20. Therefore, the use can use the receiving device even in walking.

Although the visible light receiving device and the visible light receiving method according to the present invention have been described with reference to the embodiments as above. However, the present invention is not limited to these embodiments. Those skilled in the art will be readily appreciated that various modifications of the exemplary embodiments and combinations of the structural elements of the different embodiments are possible without materially departing from the novel teachings and advantages of the present invention. Accordingly, all such modifications and combinations are intended to be included within the scope of the present invention.

INDUSTRIAL APPLICABILITY

The visible light receiving device and the visible light receiving method according to the present invention are capable of detecting ID information of a visible light illumination device, and usable, for example, in detecting a position of a mobile terminal in an underground mall or a building.

REFERENCE SIGNS LIST 10, 50 receiving device
11, 51 first conversion unit
12, 52 amplification unit
13, 53 microcomputer
14 second conversion unit
15 first calculation unit
16 second calculation unit
17 detection unit
18 third calculation unit
19 fourth calculation unit
20 illumination device
21 driving unit
22 illumination unit
25, 55 disturbance light source
61, 133 light-receiving element
62, 72, 73, 83 resistance
63, 74 operational amplifier
64 DC power source
71 capacitor
81 current injection circuit
82 switch
95 mobile terminal
96 position information server
100 visible light communication system
110 transmitting device
13 receiving device
136 AGC

The invention claimed is:
1. A visible light receiving device comprising:
a first conversion unit configured to receive visible light and generate a voltage signal corresponding to an amount of the visible light, the visible light having an intensity that varies depending on modulated signals which have a modulated part in each of symbol time periods;
an amplification unit configured to cut a DC component in the voltage signal and amplify an AC component in the voltage signal, thereby generating an amplified voltage signal; and
a processing unit configured to process the amplified voltage signal provided from the amplification unit to generate demodulated signals of the modulated signals,
wherein the processing unit includes:
a second conversion unit configured to perform, for each of sampling time durations, analog-to-digital (AD) conversion on the amplified voltage signal provided from the amplification unit into an AD-converted value, eventually generating a plurality of AD-converted values;
a first calculation unit configured to calculate a difference between each pair among the AD-converted values to eventually generate a plurality of difference digital values;

a second calculation unit configured to calculate a positive reference value and a negative reference value based on a peak value among the difference digital values;

a detection unit configured to detect (a) at least one rising point from when successive difference digital values each greater than the positive reference value appear among the difference digital values, and (b) at least one falling point from when successive difference digital values each smaller than the negative reference value appear among the difference digital values;

a third calculation unit configured to calculate a first sample period and a second sample period, the first sample period being a period from a target rising point to a falling point detected immediately subsequent to the target rising point, and the second sample period being a period from the falling point to another rising point detected immediately subsequent to the falling point; and a fourth calculation unit configured to calculate a corresponding one of the demodulated signals for each of the symbol time periods, based on the first sample period and the second sample period which appear alongside each other in a temporal sequence in the each of the symbol time periods.

2. The visible light receiving device according to claim 1, wherein the first conversion unit further includes a circuit which is turned ON and OFF according to shift indication signals provided from the processing unit, and the processing unit is configured to:

provide a shift indication signal to turn the circuit ON, before performing the AD conversion of the second conversion unit; and provide a shift indication signal to turn the circuit OFF, after performing at least the AD conversion.

3. The visible light receiving device according to claim 1, wherein the second calculation unit is configured to calculate the positive reference value and the negative reference value which are proportional to one of a maximum value and an average value of peak values among the difference digital values.

4. The visible light receiving device according to claim 1, wherein, when two falling points appear successively in the temporal sequence, the detection unit is configured to exclude, from targets to be detected, (a) a second falling point in the two falling points and (b) a rising point immediately subsequent to the second falling point.

5. The visible light receiving device according to claim 1, wherein, when two rising points appear successively in the temporal sequence, the detection unit is configured to exclude, from targets to be detected, (a) a second rising point in the two rising points and (b) a falling point immediately subsequent to the second rising point.

6. The visible light receiving device according to claim 1, wherein the detection unit is configured to:

measure the first sample period and the second sample period when two falling points appear successively in the temporal sequence, the first sample period being measured from (a) one of (a-1) a rising point immediately prior to a first falling point in the two falling points and (a-2) a rising point immediately subsequent to a second falling point in the two falling points to (b) the first falling point, and the second sample period being measured from (a) the one of the rising points to (c) the second falling point; and detect one of the two falling points which corresponds to one of the first sample period and the second sample period which is closer to an integral multiple of a slot time period, and exclude an other one of the two falling points from a target to be detected.

7. The visible light receiving device according to claim 1, wherein the detection unit is configured to:

measure the first sample period and the second sample period when two rising points appear successively in the temporal sequence, the first sample period being measured from (a) one of (a-1) a falling point immediately prior to a first rising point in the two rising points and (a-2) a falling point immediately subsequent to a second rising point in the two rising points to (b) the first rising point, and the second sample period being measured from (a) the one of the falling points to (c) the second rising point; and detect one of the two rising points which corresponds to one of the first sample period and the second sample period which is closer to an integral multiple of a slot time period, and exclude an other one of the two rising points from a target to be detected.

8. The visible light receiving device according to claim 1, wherein the first calculation unit is configured to calculate, as a difference digital value at a target sampling point among the difference digital values, a difference between (a) an AD-converted value at the target sampling point and (b) an AD-converted value at another sampling point that is the second or more sampling point from the target sampling point, and the each of the sampling time durations is set to be equal to or shorter than one twelfth of each of the symbol time periods.

9. A visible light communication system comprising:

the visible light receiving device according to claim 1; and a visible light transmitting device.

10. A mobile terminal comprising the visible light receiving device according to claim 1.

11. A visible light receiving method of obtaining information from visible light, the visible light receiving method comprising:

performing, by a first conversion unit, AD conversion on a voltage signal generated according to received visible light to generate an AD-converted value for each of sampling time durations, eventually generating a plurality of AD-converted values;

calculating a difference between each pair among the AD-converted values to generate a plurality of difference digital values;

calculating a positive reference value and a negative reference value based on a peak value among the difference digital values;

detecting (a) at least one rising point from when successive difference digital values each greater than the positive reference value appear among the difference digital values, and (b) at least one falling point from when successive difference digital values each smaller than the negative reference value appear among the difference digital values;

calculating a first sample period and a second sample period, the first sample period being a period from a target rising point to a falling point detected immediately subsequent to the target rising point, and the second sample period being a period from the falling point to another rising point detected immediately subsequent to the falling point; and calculating a demodulated signal corresponding to the voltage signal for each of symbol time periods, based on the first sample period and the second sample period which appear alongside each other in a temporal sequence in the each of the symbol time periods.

12. The visible light receiving method according to claim 11, further comprising:
providing a shift indication signal to turn the circuit ON, before the performing of the AD conversion; and
providing a shift indication signal to turn the circuit OFF, after performing at least the providing of the shift indication signal.

* * * * *